May 31, 1932.　　　C. L. EKSERGIAN　　　1,860,665
VEHICLE WHEEL
Filed March 5, 1931
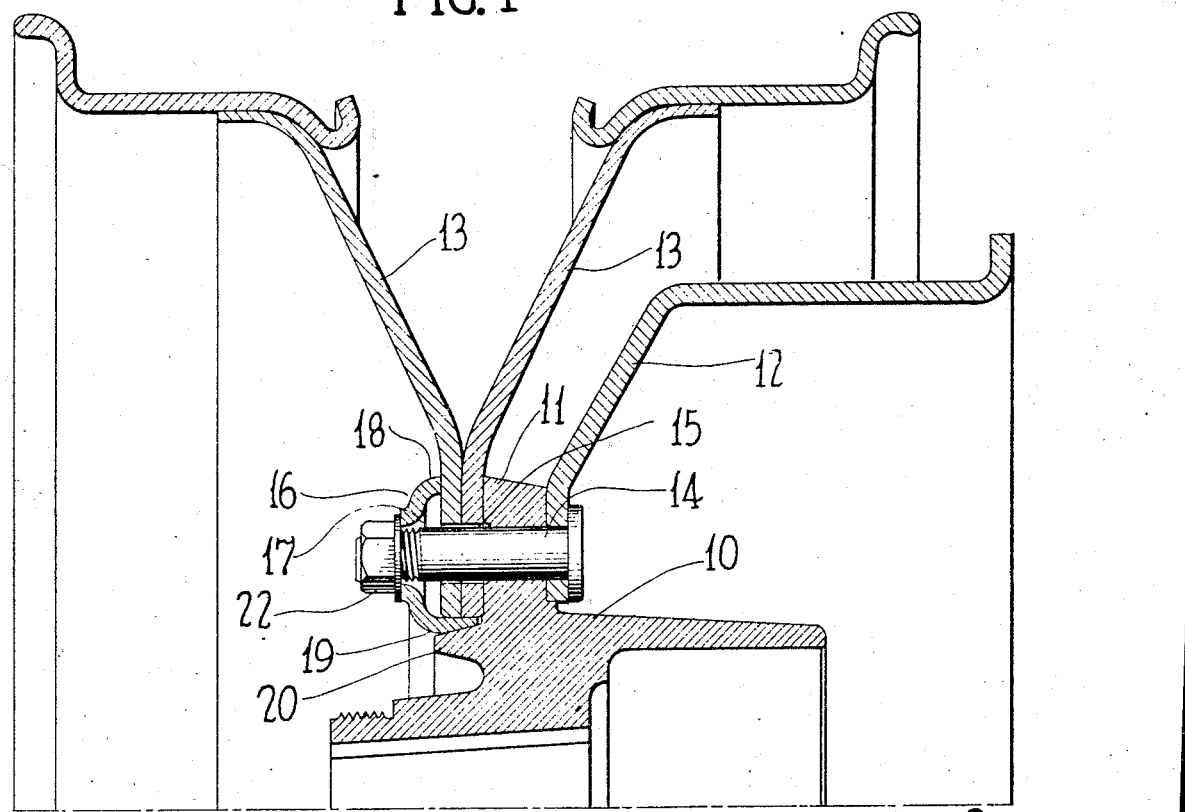
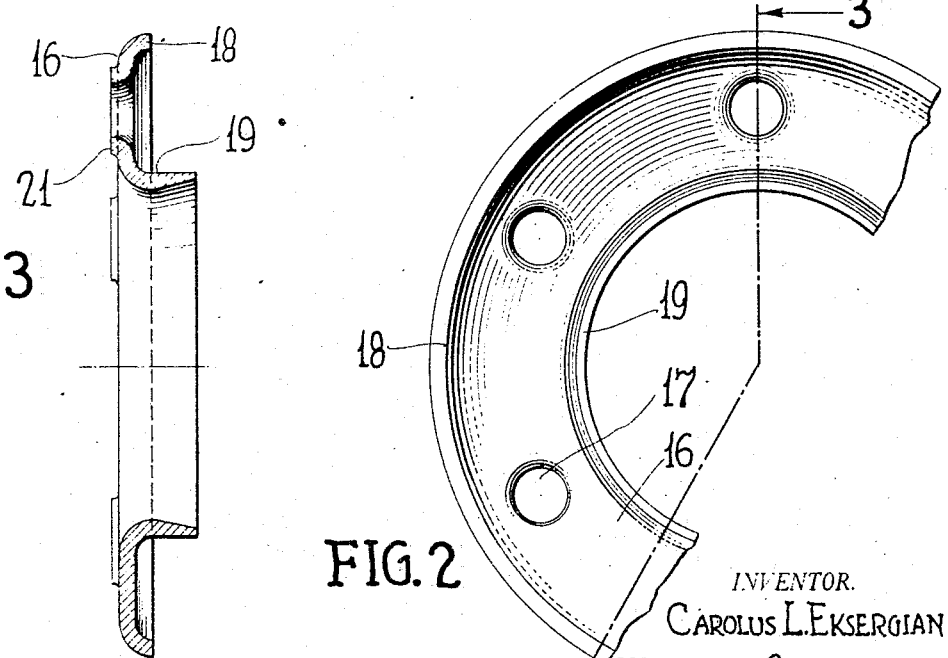
INVENTOR.
CAROLUS L. EKSERGIAN
BY
ATTORNEY.

Patented May 31, 1932

1,860,665

UNITED STATES PATENT OFFICE

CAROLUS L. EKSERGIAN, OF DETROIT, MICHIGAN, ASSIGNOR TO BUDD WHEEL COMPANY, OF PHILADELPHIA, PENNSYLVANIA, A CORPORATION OF PENNSYLVANIA

VEHICLE WHEEL

Application filed March 5, 1931. Serial No. 520,193.

My invention pertains to the art of vehicle wheels and it has been my object to provide a wheel rigidly reinforced in the region of a zone of securement to a vehicle hub flange and supported in such a manner that it is rigidly clamped in position and strongly supported against both axially and radially imposed stresses. It has its most important application in connection with the securement of disc wheels to hubs and is particularly devised for the purpose of securing a strong and effective mounting of disc wheels of the dual type. It will be obvious, however, that it has advantages which recommend it for use in the securement of other types of wheels as well.

In order to achieve the aforementioned objects, I have devised a simple and inexpensive reinforcing ring adapted to abut the outer side of a wheel body and provided with a flange which underlies the wheel body and rests upon a shoulder upon the hub to support the wheel against radial stresses.

Other objects and advantages of my invention and the manner in which I have attained them will be obvious from a reading of the sub-joined specification in the light of the attached drawings, in which;

Fig. 1 is a central axial sectional view through my improved wheel.

Fig. 2 is an inside side elevation of my securing ring, and

Fig. 3 is a section on the line 3—3 of Fig. 2.

Referring to the drawings by reference characters, the numeral 10 indicates the hub of the vehicle. The hub is provided intermediate its ends with a radially extending flange 11 against the rear side of which the brake drum 12 is adapted to be secured. A wheel body in the form of a pair of duplicate reversely curved discs 13 is secured against the forward radial side of the hub flange, the hub portions of the discs being thus arranged in face to face relationship.

My invention pertains to the method of securing these disc bodies upon the hub flange. Annularly arranged series of securing bolts 14 pass through the hub flange and secure the brake drum in place against the rear side thereof. The discs 13 are provided with openings 15 adapted to receive these securing bolts.

In accordance with my invention I provide an annulus 16 for abutment against the outer radial face of the wheel body. This annulus is provided with a series of openings 17 adapted to receive the bolts 14 and these openings are turned outwardly to provide bosses 21 against which the securing nuts 22 seat when the wheel is secured in place. The annulus is provided with an annular flange 18 adjacent its outer periphery adapted to abut the radial outer face of the outer disc and clamp the discs firmly in position against the hub flange 11. Adjacent its inner periphery the annulus is provided with an axially extending tapered flange 19 adapted to coact with a tapered seat 20 formed by a shoulder projecting axially outwardly from the hub flange.

The mode of operation of my invention and the advantages thereof will now be apparent. After the wheel bodies are arranged in place over the bolts 14 the annulus 16 is inserted in position with its inner flange 19 underlying the wheel bodies and its outer flange 18 in substantial abutment therewith. The nuts 22 are then turned up against the bosses 21 to clamp the wheel in place. This causes the annulus to move axially inwardly and the tapered face of the flange 19 thus rides up upon the tapered face of the shoulder 20 tending to clamp the wheel firmly against radial play. As the same time the flange 18 upon the outer periphery of the annulus abuts the outer disc body and clamps it firmly against the flange 11. If the proportions of parts are such that the wheel body becomes tightly clamped by one of the flanges before the other flange is moved sufficiently to effect its clamping function, the resilience of the ring will permit it to flex slightly until it has reached a position in which it effects its dual clamping function.

The objects of my invention will be readily apparent. I have not only provided a wheel body which is clamped in a much more rigid manner than those previously known in the art, but I have combined the advantages of such clamping with the reinforcement of an additional ring in the nave portion of the wheel which reinforces the wheel by providing additional metal in this vulnerable part.

Modifications will be obvious to those skilled in the art and I do not therefore wish to be limited except by the scope of my subjoined claims as interpreted in the light of the generic spirit of my invention.

What I claim is:

1. A vehicle wheel including, in combination, a hub having a radially extending face, and annularly arranged series of bolts projecting from said face, a wheel body mounted against said face and having openings which receive the bolts projecting from the hub, an annulus having a portion abutting against the outer face of said wheel body to clamp the same to the hub, said annulus being provided with a plurality of openings to receive the bolts and a flange which underlies said wheel body and supports the same radially, and nuts coacting with said bolts and bearing against said annulus to secure the parts in their proper relative positions.

2. A vehicle wheel including, in combination, a hub having a radially extending face, an annular shoulder projecting from said face, an annularly arranged series of bolts projecting from said face outwardly of said shoulder, a wheel body mounted against said face and having openings which receive the bolts projecting from the hub, an annulus having a portion abutting against the outer face of said wheel body to clamp the same to the hub, said annulus being provided with a plurality of openings to receive the bolts and a flange which rests against the annular shoulder upon the hub and underlies said wheel body to support the same radially, and nuts coacting with said bolts and bearing against said annulus to secure the parts in their proper relative positions.

3. A vehicle wheel including, in combination, a hub having a radially extending face, an annular tapered shoulder projecting from said face, an annularly arranged series of bolts projecting from said face outwardly of said tapered shoulder, a wheel body mounted against said face and having openings which receive the bolts projecting from the hub, an annulus having a portion abutting against the outer face of said wheel body to clamp the same to the hub, said annulus being provided with a plurality of openings to receive the bolts and a tapered flange which rests against the annular tapered shoulder upon the hub and underlies said wheel body to support the same radially, and nuts coacting with said bolts and bearing against said annulus to secure the parts in their proper relative positions.

In testimony whereof I hereunto affix my signature.

CAROLUS L. EKSERGIAN.